United States Patent
Bos et al.

(10) Patent No.: US 11,891,709 B2
(45) Date of Patent: Feb. 6, 2024

(54) SOLID-STATE COMPRESSOR AND METHOD FOR PROVIDING COUNTER PRESSURE ON A SOLID-STATE COMPRESSOR CELL STACK

(71) Applicant: HYET HOLDING B.V., Arnhem (NL)

(72) Inventors: Albert Bos, Arnhem (NL); Adriaan Rombout Swanborn, Arnhem (NL)

(73) Assignee: HyET Holding B.V., Arnhem (NL)

( * ) Notice: Subject to any disclaimer, the term of this patent is extended or adjusted under 35 U.S.C. 154(b) by 0 days.

(21) Appl. No.: 17/296,058

(22) PCT Filed: Nov. 21, 2019

(86) PCT No.: PCT/NL2019/050771
§ 371 (c)(1),
(2) Date: May 21, 2021

(87) PCT Pub. No.: WO2020/106153
PCT Pub. Date: May 28, 2020

(65) Prior Publication Data
US 2022/0018031 A1 Jan. 20, 2022

(30) Foreign Application Priority Data
Nov. 23, 2018 (NL) .................................... 2022067

(51) Int. Cl.
*C25B 9/05* (2021.01)
*C25B 9/63* (2021.01)
(Continued)

(52) U.S. Cl.
CPC .............. *C25B 9/05* (2021.01); *B01D 53/326* (2013.01); *C25B 1/02* (2013.01); *C25B 9/19* (2021.01);
(Continued)

(58) Field of Classification Search
CPC ................................ C25B 9/05; B01D 53/326
See application file for complete search history.

(56) References Cited

U.S. PATENT DOCUMENTS 6,321,561 B1    11/2001 Maget
2004/0040862 A1*  3/2004 Kosek ................. C01B 13/0255
                                                      205/637
(Continued)

FOREIGN PATENT DOCUMENTS

DE    102012018243 A1    3/2014
JP    2003160891 A   *   6/2003    ............. C25B 15/02
(Continued)

*Primary Examiner* — Harry D Wilkins, III
(74) *Attorney, Agent, or Firm* — The Webb Law Firm

(57) ABSTRACT

The invention relates to a solid-state compressor for electrochemically compressing a fluid, including: a compressor cell stack, including at least one compressor cell having a membrane electrode assembly sandwiched between two cell plates, an enclosure, clamping the compressor cell stack at opposing sides thereof, and at least one contact body, interposed between the compressor cell stack and the enclosure and contacting an outer surface of the compressor cell stack, wherein a space is enclosed between the enclosure and the contact body, which space is configured to contain a hydraulic fluid under pressure. The invention further relates to a method for operating such a solid-state compressor.

18 Claims, 3 Drawing Sheets

(51) Int. Cl.
*C25B 9/19* (2021.01)
*C25B 9/65* (2021.01)
*B01D 53/32* (2006.01)
*C25B 1/02* (2006.01)
*C25B 15/02* (2021.01)

(52) U.S. Cl.
CPC ............... *C25B 9/63* (2021.01); *C25B 9/65* (2021.01); *C25B 15/02* (2013.01)

(56) References Cited

U.S. PATENT DOCUMENTS

| | | |
|---|---|---|
| 2004/0211679 A1 | 10/2004 | Wong et al. |
| 2010/0078317 A1 | 4/2010 | Bourgeois |
| 2012/0217156 A1 | 8/2012 | Nakazawa et al. |
| 2013/0039779 A1 | 2/2013 | Bahar et al. |
| 2015/0001067 A1 | 1/2015 | Mantai et al. |
| 2016/0115603 A1* | 4/2016 | Gashi ................ C25B 15/08 204/255 |
| 2019/0383283 A1* | 12/2019 | Ukai ................ C25B 1/02 |

FOREIGN PATENT DOCUMENTS

| | | |
|---|---|---|
| JP | 200723343 A | 2/2007 |
| WO | 0125700 A1 | 4/2001 |

* cited by examiner

SOLID-STATE COMPRESSOR AND METHOD FOR PROVIDING COUNTER PRESSURE ON A SOLID-STATE COMPRESSOR CELL STACK

CROSS-REFERENCE TO RELATED APPLICATIONS

This application is the United States national phase of International Application No. PCT/NL2019/050771 filed Nov. 21, 2019, and claims priority to The Netherlands Patent Application No. 2022067 filed Nov. 23, 2018, the disclosures of which are hereby incorporated by reference in their entirety.

BACKGROUND OF THE INVENTION

Field of the Invention

The present invention relates to a solid-state compressor for electrochemically compressing a fluid. The invention further relates to an enclosure for a solid-state compressor and a pressure adjustment mechanism for use in a solid-state compressor. The invention moreover relates to a method for operating a solid-state compressor according to the invention.

Description of Related Art

Where conventional mechanical compressors utilize mechanical means such as pistons or rotors for the compression of a fluid, solid-state compressors rely on the electrochemical transport of said fluid through a membrane using an ionic transport mechanism. In order to compress the working fluid in an electrochemical manner, a solid-state compressor typically comprises a compressor cell that is made up of one or more stacked membrane electrode assemblies (also known as MEA's). The electrodes of the MEA are connected to a power supply for maintaining an electric potential difference across the electrodes. This potential difference is necessary to electrochemically move the ionized working fluid through the proton exchange membrane (commonly known as a PEM) against the pressure gradient that exists across the membrane. The direction of the electrical current hereby determines the direction of the ionic transport, wherein the low-pressure working fluid is ionized at the positively charged anode and recombined with the separated electrons at the high-pressure cathode side of the MEA.

A commonly known solid-state compressor is the electrochemical hydrogen compressor wherein hydrogen is fed to the compressor cell and oxidized to protons and electrons. The protons are then driven through the membrane and the electrons are transferred via an external circuit, after which the protons and electrons are reduced back to molecular hydrogen. In this process, the hydrogen moves against a pressure gradient from an area of low-pressure to an area of high-pressure, resulting in the pressure rise across the membrane. The compression of other working fluids, such as water of ammonia are however also possible.

Solid-state compressors have a number of significant advantages over mechanical compressors. Namely, solid-state compressors have no moving parts and generally have a compact design. Moreover, solid-state compressors allow fluids to be compressed to very large pressures up to and above 1000 bar at operating efficiencies exceeding those of mechanical compressors. As an additional advantage, electrochemical compression also leads to the purification of the working fluid as the membrane allows for the transport of the ionized working fluid only.

In the process of compressing the working fluid, very high-pressure differentials exist over the different sides of the compressor cell. In order to maintain said pressure differentials and gain sufficient sealing of the compressor cell, a large enough counter-pressure needs to be exerted on the compressor cell. For this purpose, the compressor cell is typically clamped between two flanges kept together with an array of bolts engaging the flanges near their peripheral edges.

A drawback of this clamping structure is that due to the high-pressures in the compressor cell, the compressor cell will exert an evenly distributed gas pressure force on the flanges. As a result, the flanges will tend to bend in their centre away from the point of engagement of the array of bolts holding the flanges together. This in turn leads to poor electric contact in the middle part of the compressor cell or even rupture of the cell internals.

Another problem with the above-described clamping structure is caused by the contraction and expansion of the compressor cell due to thermal and pressure effects occurring during the electrochemical compression of the working fluid, thereby varying sealing and contact pressure between the compressor cell and the respective flanges. Due to this variation in pressures and continuous motion of the compressor cell during expansion and contraction, the bolted joints will gradually loosen over time. This will cause leakage and requires regular inspection and re-tightening of the bolted joints.

SUMMARY OF THE INVENTION

An object of the present invention is to provide a solution for at least one of the above-mentioned drawbacks.

The invention thereto proposes a solid-state compressor for electrochemically compressing a fluid, comprising: a compressor cell stack, comprising at least one compressor cell having a membrane electrode assembly sandwiched between two cell plates, an enclosure, clamping the compressor cell stack at opposing sides thereof, and at least one contact body, interposed between the compressor cell stack and the enclosure and contacting an outer surface of the compressor cell stack, wherein a space is enclosed between the enclosure and the contact body, which space is configured to contain a hydraulic fluid under pressure.

The solid-state compressor may be an electrochemical hydrogen compressor, but may also be configured for compressing other working fluids such as water of ammonia. The working principle of these solid-state compressors is the same in that it compresses the working fluid by letting the working fluid pass through a membrane electrode assembly that is part of a compressor cell. The compressor cell may hereby be part of a compressor cell stack comprising multiple compressor cells. Each of the compressor cells thus comprises a membrane electrode assembly which is clamped between two cell plates, wherein the cell plates function to separate and support the different membrane electrode assemblies as well as supplying the working fluid to and guiding the working fluid away from the membrane electrode assembly.

However, the invention does explicitly not relate to an electrolyser or any similar apparatus for changing $H_2O$ into $H_2$ and $O$. The apparatus according to the invention is an apparatus for receiving $H_2$ with a low pressure and outputting $H_2$ with a high pressure.

The compressor cell stack comprises an outer surface that faces away from the at least one membrane electrode assembly contained therein. In order to compensate for the inner pressures in the compressor cell stack during operation of the solid-state compressor, the enclosure clamping the cell stack is configured to exert a counter pressure on the cell stack at least equal to and commonly exceeding this inner pressure in the compressor cell stack. Said counter pressure is hereby exerted on the outer surface of the compressor cell stack via an interfacing entity in the form of a contact body. The contact body contacts, and particularly fully contacts the outer surface of the compressor cell stack, which outer surface is in a common instance formed by an outermost cell plate of the cell stack. This allows the contact body to effectively to pass along the forces exerted by the compressor stack onto the enclosure and vice versa.

As a space is enclosed between the enclosure and the contact body, the counter pressure provided by the enclosure is however not exerted directly on the contact body. Instead, a pressurized hydraulic fluid is contained within the above-mentioned space and therewith interposed between the enclosure and the contact body. The forces exerted by the enclosure onto the compressor cell stack are thus transferred through both the contact body and the hydraulic fluid.

A major advantage of this construction is that a uniform contact and distribution of pressure over the contact body and therewith over (the outer surface of) the compressor cell stack is achieved at all times. Even if the enclosure itself may bend or deform under the large pressures prevailing in the compressor cell stack, due to the space containing the pressurized hydraulic fluid the compressor according to the present invention is able retain a counter pressure uniformly distributed over the contact body and compressor cell stack. It herewith solves the problem of poor electric contact in the middle part of the compressor cell stack and possible rupture of the cell internals.

An additional advantage of letting the enclosure exert the necessary counter pressure onto the compressor cell stack via the contact body and the pressurized hydraulic fluid is that, in the case that the counter pressure on the cell stack exceeds the inner pressure in the compressor cell stack, gradual loosening of the connections between the different parts of the enclosure that urge the enclosure together, allowing the enclosure to compress the cell stack, has no immediate effect on the integrity of the cell stack. In the case of a direct connection between the cell stack and the enclosure, the loosening of the connections and a consecutive relative displacement of the different parts of the enclosure will cause a loss of contact between the enclosure and the compressor cell stack, thereby causing leaking of the cell stack. The pressurized hydraulic fluid will however keep a uniform contact with the contact body at the only expense of a somewhat decease in hydraulic pressure in case the connections between the different parts of the enclosure loosen up to the extent that some displacement of the enclosure parts takes place, thus increasing the volume of the space to a small extent.

In an advantageous embodiment of the solid-state compressor according to the present invention, the solid-state compressor comprises a pressure adjustment mechanism configured for adjusting the pressure of the hydraulic fluid contained in the space. It is however also possible that the space between the enclosure and the contact body is fixed volume wise and that a fixed amount of hydraulic fluid under pressure is contained within said space. In this case that the hydraulic fluid is pressurized to a fixed pressure. This pressure however needs to be aimed at compensating for the highest possible internal pressure of the compressor cell stack. The compressor including the cell stack and enclosure therefore needs to constantly endure pressures equal to or larger than the highest possible internal pressure the compressor cell stack is designed for.

By being able to adjust the pressure prevailing in the hydraulic fluid as contained in the space between the enclosure and the contact body, counter pressures may be chosen that exceed the current operating pressure inside the cell stack and therefore provide for the necessary sealing. However, these counter pressure may now be chosen lower than the highest possible internal pressure of the compressor cell stack as the hydraulic fluid pressure and therewith the counter pressure can be increased with increasing operating pressures of the cell stack.

The pressure adjustment mechanism may be further configured to adjust the hydraulic fluid pressure based on a pressure prevailing on a cathode side of the at least one membrane electrode assembly. The cathode side of the membrane electrode assembly is the side at which the working fluid is compressed. An increase in internal cell stack pressure as prevailing on the cathode side will in most cases necessitate a higher hydraulic fluid pressure to provide for the necessary counter pressure and therewith a proper sealing of the compressor cell stack. In case the hydraulic fluid pressure is controlled based on a pressure prevailing on a cathode side of the at least one membrane electrode assembly, it can be ascertained that the counter pressure provided by the pressurized hydraulic fluid automatically equals or exceeds the internal cell stack pressure.

To further ensure the proper sealing and integrity of the compressor cell stack, the pressure adjustment mechanism may be configured for keeping a fixed ratio between the pressure prevailing on the cathode side of the at least one membrane electrode assembly and the hydraulic fluid pressure. It is hereby preferred that the hydraulic fluid pressure is larger, preferably between 1.5 times and 2.5 times larger, and more preferably 2 times larger than the pressure prevailing on the cathode side of the at least one membrane electrode assembly. A dynamic control of the hydrostatic pressure inside the space enclosed between the enclosure and the contact body is herewith obtained.

In a further embodiment of the solid-state compressor according to the invention, the space enclosed between the enclosure and the contact body is hydraulically linked with a hydraulic fluid reservoir. The reservoir effectively enlarges the total volume of hydraulic fluid that acts to provide the counter pressure exerted onto the contact body and concurrently onto the outer surface of the compressor cell stack. In the case of a leakage of hydraulic fluid wherein a part of the hydraulic fluid leaks away, the increased hydraulic fluid volume will ensure a decreased drop in pressure. It is therefore less likely that a hydraulic fluid leak immediately causes the pressure to drop to a level below that of the cell stack internal pressure. Moreover, the presence of a hydraulic fluid reservoir provides access to the hydraulic fluid contained in the reservoir and space enclosed between the enclosure and the contact body away from the compressor cell stack itself.

As a possible way to adjust the hydraulic fluid pressure in the space, the combination of contact body and compressor cell stack may be moveably connected to the enclosure such that it is displaceable relative to the enclosure. This way, the space enclosed between the enclosure and the contact body can be changed in volume, thereby adjusting the pressure prevailing in the hydraulic fluid. In the case that the space is hydraulically linked with a hydraulic fluid reservoir, the hydraulic fluid reservoir may alternatively or additionally have a variable volume in order to change the total volume of the closed system comprising the hydraulically linked space and hydraulic fluid reservoir, thereby adjusting the degree of compression of the hydraulic fluid and therewith the amount of counter pressure exerted on the compressor cell stack. The pressure adjustment mechanism may hereby be configured for adjusting the volume of the above-mentioned hydraulic fluid reservoir.

As a way of adjusting the volume of the hydraulic fluid reservoir, the pressure adjustment mechanism may comprise a displacer piston, comprising a first piston head surface standing in contact with the hydraulic fluid reservoir, for changing the volume of the hydraulic fluid reservoir upon displacement of the piston head. The displacer piston is typically contained within a housing, wherein the housing encloses the piston head in a fluid-tight manner. The housing hereby connects to or merges into a wall of the hydraulic fluid reservoir, such that the first piston head interfaces the hydraulic fluid. When the displacer piston is moved inwards towards the hydraulic fluid reservoir, the volume of the hydraulic fluid reservoir is effectively reduced, wherein the hydraulic fluid contained therein is compressed further. When the displacer piston is moved outwards away from the hydraulic fluid reservoir, the volume of the hydraulic fluid reservoir is effectively increased, wherein the hydraulic fluid contained therein is compressed to a lesser extent.

The displacer piston may also comprise a second piston head surface opposing the first piston head surface, which second piston head surface stands in contact with a pressurized fluid reservoir for changing the volume of the pressurized fluid reservoir upon displacement of the piston head. Just like the first piston head, the second piston head may be contained within a housing, wherein the housing encloses the piston head in a fluid-tight manner and connects to or merges into a wall of—in this case—the pressurized fluid reservoir. When the displacer piston is moved inwards towards the pressurized fluid reservoir, the volume of the pressurized fluid reservoir is effectively reduced, wherein the pressurized fluid contained therein is compressed further. When the displacer piston is moved outwards away from the pressurized fluid reservoir, the volume of the pressurized fluid reservoir is increased, wherein the pressurized fluid contained therein is compressed to a lesser extent. As the first and second piston heads are part of the same piston, an inward movement of the first piston head will bring about an outward movement of the second piston head and vice versa. With this concurrent movement of the piston heads, the volumes of the reservoirs are adjusted in dependency with each other, thereby balancing the pressures prevailing in the hydraulic fluid reservoir and the pressurized fluid reservoir.

It is specifically advantageous if the cathode side of the at least one membrane electrode assembly is linked with the pressurized fluid reservoir, causing the fluid in the pressurized fluid reservoir to be under the same pressure as the compressed working fluid on the cathode side of the membrane electrode assembly. In a possible embodiment, the link between the cathode side of the membrane electrode assembly and the pressurized fluid reservoir is a fluidal link, wherein the fluid contained in the pressurized fluid reservoir is in fact the same as the working fluid pressurized by the solid-state compressor. The benefit of such fluidal link between the cathode side of the membrane electrode assembly and the pressurized fluid reservoir is that the hydraulic fluid pressure and therefore the counter pressure on the compressor cell stack is automatically adjusted based on the internal cell stack pressure.

With the fluidal link, a change in pressure at the cathode side of the membrane electrode assembly causes a similar change in pressure of the fluid in the pressurized fluid reservoir. As the two opposing but dependently displaceable piston heads of the displacer piston are in contact with the hydraulic fluid reservoir and the pressurized fluid reservoir respectively, the pressure change in the pressurized fluid reservoir will cause displacer piston to displace, thereby changing the pressure in the hydraulic fluid reservoir concurrently. Given that the space enclosed between the enclosure and the contact body is hydraulically linked with a hydraulic fluid reservoir, the pressure of hydraulic fluid contained in the space will also change, thus influencing the amount of counter pressure exerted on the compressor cell stack via the contact body.

In order to achieve a fixed pressure ratio between the pressures prevailing in the hydraulic fluid reservoir and the pressurized fluid reservoir the areas of the first and second piston head surfaces may mutually differ. Specifically, the ratio between the areas of the first and second piston head surfaces interfacing the hydraulic fluid and pressurized fluid respectively determines the pressure ratio of the pressures prevailing in the hydraulic fluid reservoir and pressurized fluid reservoir. Namely, the forces applied onto the piston heads perpendicular to their surfaces interfacing the pressurized fluids is equal to the pressure multiplied by their surface areas. By choosing the areas of the first and second piston head surfaces according to the preferred difference in pressures prevailing in the hydraulic fluid reservoir and pressurized fluid reservoir, the relative counter pressure exerted onto the compressor cell stack can thus be controlled automatically and dynamically.

In yet a further embodiment of the solid-state compressor according to the invention, the solid-state compressor comprises two contact bodies, each interposed between the enclosure and a different one of two opposing sides of the compressor cell stack, wherein a space is enclosed between the enclosure and the respective contact bodies, which spaces are configured to contain a hydraulic fluid under pressure. An advantage of this embodiment is that the hydraulic fluid contained in both spaces achieves a uniform contact and distribution of pressure over the contact bodies. The pressure of the hydraulic fluid contained in either one of these spaces may be adjusted by a pressure adjustment mechanism according to any of embodiments as previously described.

In order to create a self-balancing system, the contact bodies may be moveably embedded within the enclosure such that the volume of the spaces between the enclosure and the respective contact bodies changes upon a movement of the contact bodies relative to the enclosure. As the contact bodies stand in contact with opposing sides of the compressor cell stack, the cell stack will move concurrently with the contact bodies. This movement of the combination of contact bodies and cell stack within the enclosure allows for the balancing of pressures of the hydraulic fluid contained in each of the spaces respectively. In the case that the hydraulic fluid pressure in one of the spaces is changed, for example by means of a pressure adjustment mechanism as described in one of the previously discussed embodiments, the contact bodies and cell stack will shift inside the enclosure thereby changing the volume of the spaces and equalizing the pressures prevailing in each of the spaces.

As another way of creating a self-balancing system the spaces between the enclosure and the contact bodies may be hydraulically linked with each other. In this manner, the pressure in each of the spaces will also be kept equal.

In a particular embodiment the enclosure may comprise two opposing and interconnected flanges that respectively grip around each of the contact bodies, thereby entirely enclosing a surface of said contact bodies opposing the surface contacting an outer surface of the compressor cell stack. A benefit of entirely enclosing this surface of the contact bodies is that no direct contact is made between the enclosure (flanges) and the surfaces of contact bodies the compressive forces are exerted onto. Instead, surfaces are fully contacted by the hydraulic fluid, ensuring a uniform pressure distribution thereon. In a common instance, the flanges grip around each of the contact bodies far enough to allow the contact bodies to move relative to the flanges while retaining a fluid-tight sealing between the flanges and the contact bodies.

It is possible that the opposing flanges are mutually connected through a connection pre-loaded in tension, which preload urges the opposing flanges towards each other such that the hydraulic fluid contained in the spaces is compressed. Through the compression of the hydraulic fluid the connection concurrently introduces a compression preload in the clamped compressor cell stack. The preload is generally chosen to equal or exceed the highest possible pressure under which the compressor cell stack is designed to operate.

The opposing flanges may be interconnected one or more bolted joints. In order to counteract the effects of creep and loosening of the bolted joints, thereby losing on the original preload of the bolted joints, one or more Belleville washers may be positioned between at least one of the flanges and a bolt head or nut of the bolted joint.

The invention also relates to an assembly of an enclosure and at least one contact body for a solid-state compressor according to the invention. The invention further relates to a pressure adjustment mechanism for adjusting the pressure in a hydraulic fluid contained within a space enclosed between an enclosure and a contact body of a solid-state compressor according to invention. The specifics as well as the benefits of the assembly and pressure adjustment mechanism are already described in detail in relation to the various possible embodiments of the solid-state compressor according to the invention.

Last, the invention relates to a method for operating a solid-state compressor according to the invention, comprising introducing a hydraulic fluid under pressure in the space between the enclosure and the contact body. The method may further comprise adjusting the pressure in the hydraulic fluid. The pressure in the hydraulic fluid may hereby be adjusted based on the pressure prevailing on a cathode side of the at least one membrane electrode assembly. As a possibility a fixed ratio may be kept between the pressure prevailing on the cathode side of the at least one membrane electrode assembly and the pressure in the hydraulic fluid. The pressure in the hydraulic fluid may in this case be kept larger, preferably between 1.1 times and 2.5 times larger, and more preferably 2 times larger than the pressure prevailing on the cathode side of the at least one membrane electrode assembly. The specifics as well as the benefits of any of these methods for operating a solid-state compressor are already described in detail in relation to the various possible embodiments of the solid-state compressor according to the invention.

BRIEF DESCRIPTION OF THE DRAWINGS

In order to further elucidate the invention, exemplary, non-limitative embodiments will be described with reference to the figures. In the figures.

The figures represent specific exemplary embodiments of the invention and should not be considered limiting the invention in any way or form. Throughout the description and the figures corresponding reference numerals are used for corresponding elements.

DESCRIPTION OF THE INVENTION

Figure 1:
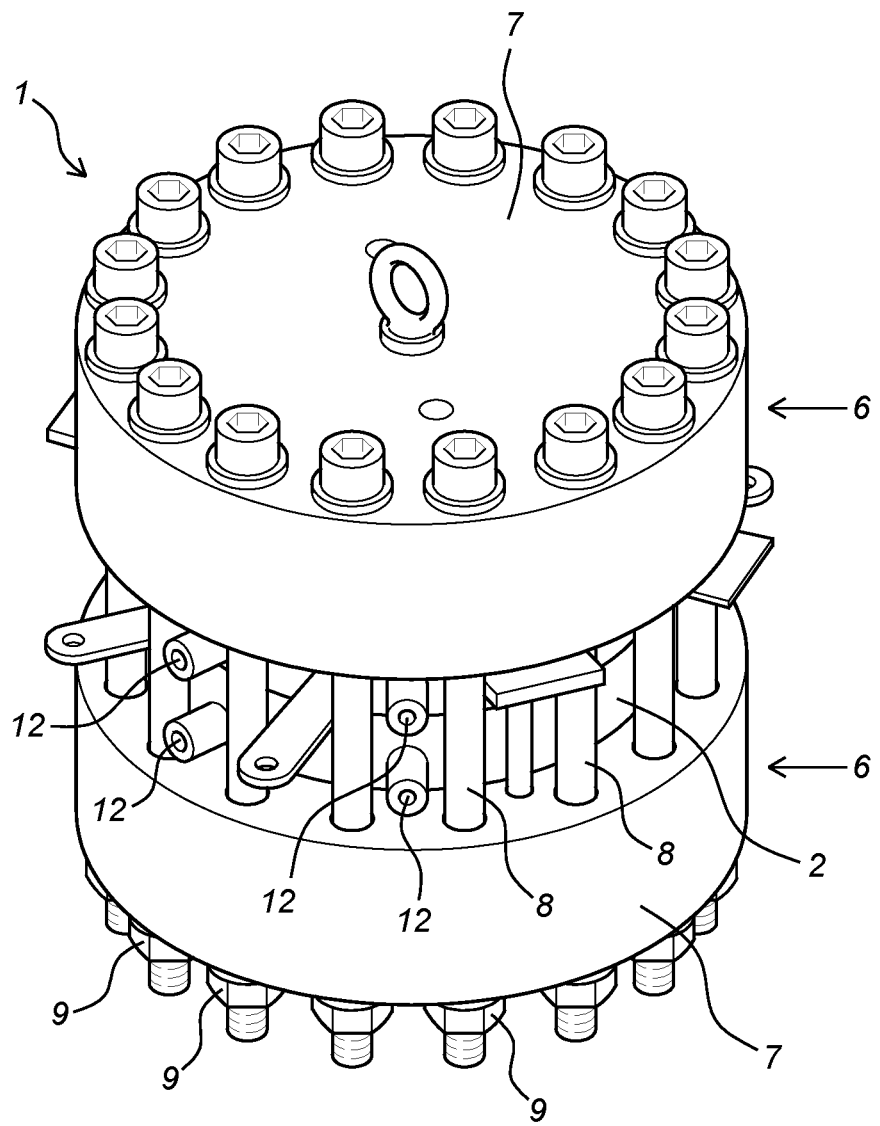
FIG. 1 shows a perspective view on a solid-state compressor according to the invention.
Figure 2:
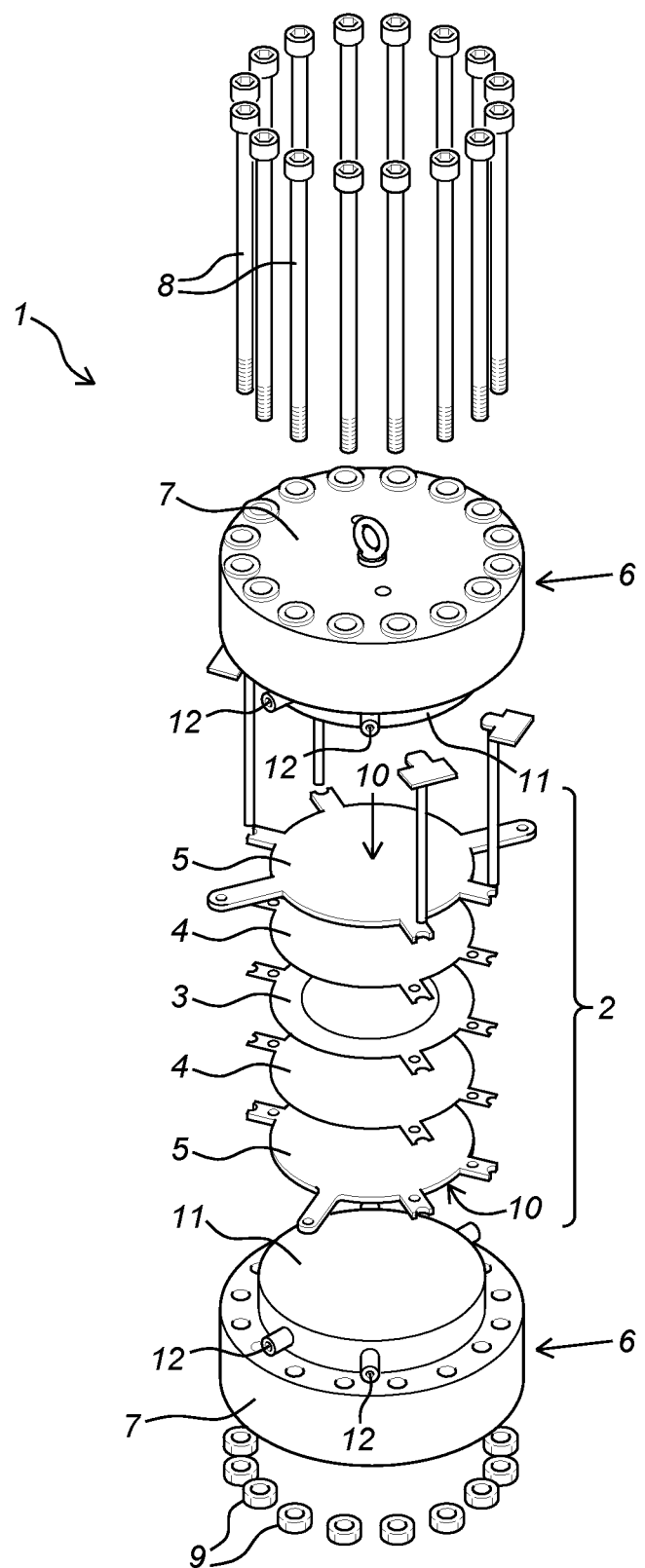
FIG. 2 shows an exploded view on the solid-state compressor of FIG. 1.

FIGS. 1 and 2 respectively show a perspective view and an exploded view on a solid-state compressor 1 according to the invention. The solid-state compressor 1 comprises a compressor cell stack 2 comprising multiple membrane electrode assemblies 3 sandwiched between cell plates 4. The outermost plates 5 of each cell stack 2 are commonly formed by current collector plates to act as a pass-through for electrically connecting the electrodes to a power source. The compressor cell stack 2 is at opposing sides clamped between an enclosure 6 that keeps a pressure onto the cell stack 2. The shown enclosure 6 comprises two flanges 7 that are interconnected near their peripheral edges by an array of bolted joints formed by bolts 8 and nuts 9. Interposed between opposing outer surfaces 10 of the cell stack 2 and the enclosure 6 are two contact bodies 11 that stand in contact with said outer surfaces 10. As can be seen in the hereafter discussed FIG. 3, a space is enclosed between each of the flanges 7 and contact bodies 11, which space contains a pressurized hydraulic fluid. In order to supply hydraulic fluid to or retract hydraulic fluid from this space, the contact bodies 11 are on their sides provided with hydraulic fluid supply openings 12.

Figure 3:
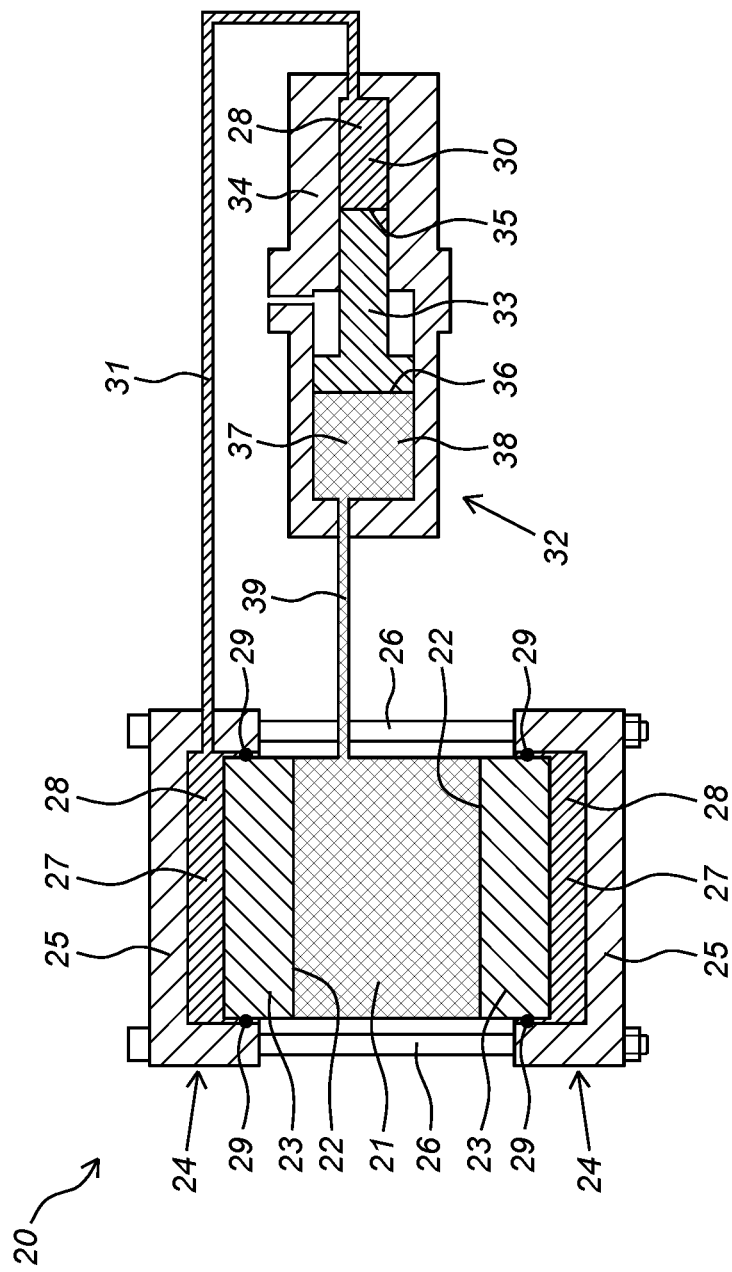
FIG. 3 shows a schematic sectional view of a solid-state compressor according to the invention.

FIG. 3 shows a schematic sectional view of a solid-state compressor 20 according to the invention. Again, a compressor cell stack 21 is shown, of which two opposing outer surfaces 22 are clamped between two contact bodies 23. The combination of cell stack 21 and contact bodies 23 is enclosed by an enclosure 24, comprising two opposing flanges 25 interconnected by means of bolted joints 26. The flanges 25 hereby grip around each of the contact bodies 23, fully enclosing the surfaces of the contact bodies opposing the surfaces contacting the outer surfaces 22 of the cell stack 21. Between the flanges 25 and the contact bodies 23, spaces 27 are enclosed, which contain a pressurized hydraulic fluid 28. Seals 29 are provided between the sides of the flanges 25 and the contact bodies 23 in order to obtain a closed-off volume able to contain the pressurized hydraulic fluid 28. The upper one of the spaces 27 is hydraulically connected to a hydraulic fluid reservoir 30 by means of a hydraulic fluid line 31. The lower one of the spaces 27 is in this depicted embodiment of the solid-state compressor not hydraulically linked to a hydraulic fluid reservoir, nor hydraulically linked to the upper space. As such, a passive pressure compensation system is obtained on the lower side of the solid-state compressor 20. Last mentioned variations however lie within the scope of the invention.

The volume of the hydraulic fluid reservoir 30 is variable through a pressure adjustment mechanism 32 comprising a displacer piston 33. The displacer piston 33 is moveable within the piston housing 34 and comprises a first piston head surface 35 that stands in direct contact with the hydraulic fluid 28 contained in the hydraulic fluid reservoir 30. The displacer piston further comprises a second piston head surface 36 opposing the first piston head surface 35, which second piston head surface 36 stands in direct contact with a pressurized fluid 37 contained within a pressurized fluid reservoir 38. Given that the first and second piston head surfaces 35,36 are part of the same piston, they will perform a concurrent movement thereby balancing the pressures in the pressurized fluid and hydraulic fluid reservoir 30,38. The ratio between the pressures in both reservoirs is hereby dependent on the surface areas of the piston head surfaces 35,36. The pressurized fluid reservoir 38 is connected to the cathode side of the membrane electrode assemblies contained in the cell stack 21 via a pressurized fluid line 39. The pressurized fluid 37 contained in the pressurized fluid reservoir 38 is therefore the same as the working fluid of the compressor 20.

The invention claimed is:

1. A solid-state compressor for electrochemically compressing a fluid, comprising:
    a compressor cell stack, comprising at least one compressor cell having a membrane electrode assembly sandwiched between two cell plates,
    an enclosure comprising two opposing and interconnected flanges, clamping the compressor cell stack at opposing sides thereof, and
    two contact bodies, each of the two contact bodies interposed between the enclosure and a different one of two opposing sides of the compressor cell stack, and
    two spaces, each of the two spaces enclosed between the enclosure and a respective contact body of the two contact bodies, each of the two spaces configured to contain a hydraulic fluid under pressure,
        wherein a first space of the two spaces located on a first side of the opposing sides is hydraulically connected to a hydraulic fluid reservoir by means of a hydraulic fluid line;
        wherein a second space of the two spaces located on a second side of the opposing sides is not hydraulically connected to the hydraulic fluid reservoir or the first space to maintain a passive pressure compensation system on the second side;
        wherein the first side of the opposing sides is the cathode side of the membrane electrode assembly; and
        wherein the two opposing flanges respectively grip around each of the two contact bodies, thereby entirely enclosing a first surface of a first contact body of the two contact bodies opposing a second surface of the first contact body of the two contact bodies contacting an outer surface of the compressor cell stack and a first surface of a second contact body of the two contact bodies opposing a second surface of the second contact body of the two contact bodies contacting the outer surface of the compressor cell stack.

2. The solid-state compressor according to claim 1, wherein the solid-state compressor comprises a pressure adjustment mechanism configured for adjusting the pressure of the hydraulic fluid contained in the first space.

3. The solid-state compressor according to claim 2, wherein the pressure adjustment mechanism is configured to adjust the hydraulic fluid pressure based on a pressure prevailing on the cathode side of the at least one membrane electrode assembly.

4. The solid-state compressor according to claim 3, wherein the pressure adjustment mechanism is configured for keeping a fixed ratio between the pressure prevailing on the cathode side of the at least one membrane electrode assembly and the hydraulic fluid pressure.

5. The solid-state compressor according to claim 4, wherein the hydraulic fluid pressure is larger than the pressure prevailing on the cathode side of the at least one membrane electrode assembly.

6. The solid-state compressor according to claim 1, wherein the hydraulic fluid reservoir has a variable volume, wherein the pressure adjustment mechanism is configured for adjusting the volume of the hydraulic fluid reservoir.

7. The solid-state compressor according to claim 6, wherein the pressure adjustment mechanism comprises a displacer piston, comprising a first piston head surface standing in contact with the hydraulic fluid reservoir, for changing the volume of the hydraulic fluid reservoir upon displacement of the piston head.

8. The solid-state compressor according to claim 7, wherein the displacer piston comprises a second piston head surface opposing the first piston head surface, which second piston head surface stands in contact with a pressurized fluid reservoir for changing the volume of the pressurized fluid reservoir upon displacement of the piston head.

9. The solid-state compressor according to claim 8, wherein an area of the first piston head surface and an area of the second piston head surface mutually differ.

10. The solid-state compressor according to claim 1, wherein the two contact bodies are moveably embedded within the enclosure such that the volume of the two spaces change upon a movement of the two contact bodies relative to the enclosure.

11. The solid-state compressor according to claim 1, wherein the two opposing flanges are mutually connected through a connection pre-loaded in tension, which preload urges the two opposing flanges towards each other such that the hydraulic fluid contained in the two spaces is compressed.

12. The solid-state compressor according to claim 1, wherein the two opposing flanges are interconnected by at least one bolted joint.

13. The solid-state compressor according to claim 12, wherein one or more Belleville washers are positioned between at least one of the flanges and a bolt head or nut of the bolted joint.

14. A method for operating a solid-state compressor according to claim 1, comprising introducing a hydraulic fluid under pressure in the first space between the enclosure and the contact body.

15. The method according to claim 14, wherein the method further comprises adjusting the pressure in the hydraulic fluid.

16. The method according to claim 15, wherein the pressure in the hydraulic fluid is adjusted based on the pressure prevailing on a cathode side of the at least one membrane electrode assembly.

17. The method according to claim 16, wherein a fixed ratio is kept between the pressure prevailing on the cathode side of the at least one membrane electrode assembly and the pressure in the hydraulic fluid.

18. The method according to claim 17, wherein the pressure in the hydraulic fluid is kept larger than the pressure prevailing on the cathode side of the at least one membrane electrode assembly.

* * * * *